United States Patent

Bonnefoy

[11] Patent Number: 5,825,717
[45] Date of Patent: Oct. 20, 1998

[54] METHOD OF MEASURING AN ANGLE IN THREE DIMENSIONS, BY SCANNING AN ULTRASOUND BEAM

[75] Inventor: Pierre Bonnefoy, Cagnes sur Mer, France

[73] Assignee: Imra Europa SA, Valbonne, France

[21] Appl. No.: 848,581

[22] Filed: Apr. 28, 1997

[30] Foreign Application Priority Data

Apr. 29, 1996 [FR] France ................................ 96 05367

[51] Int. Cl.$^6$ .................................................. G01S 15/06
[52] U.S. Cl. ............................................................. 367/103
[58] Field of Search .................................. 367/103, 105, 367/88

[56] References Cited

U.S. PATENT DOCUMENTS

| | | | |
|---|---|---|---|
| 5,309,409 | 5/1994 | Jones et al. | 367/118 |
| 5,506,812 | 4/1996 | Zehner | 367/88 |
| 5,680,371 | 10/1997 | Miklovic | 367/103 |

FOREIGN PATENT DOCUMENTS

| | | |
|---|---|---|
| A-0-320303 | 6/1989 | European Pat. Off. . |
| A-0-451322 | 10/1991 | European Pat. Off. . |
| A-2138941 | 10/1984 | United Kingdom . |
| A-2146121 | 4/1985 | United Kingdom . |

*Primary Examiner*—Daniel T. Pihulic
*Attorney, Agent, or Firm*—Oliff & Berridge PLC

[57] ABSTRACT

A method of measuring an angle in three dimensions relative to a reference direction. In the method:

a transducer array emitter is placed in a known position relative to the reference direction;

the transducers of the array are excited so as to emit ultrasound waves in air mainly in a firing direction;

by applying phase offsets between the excitation signals for the transducers of the array, the firing direction is varied, thereby causing it to scan a given observation zone, while simultaneously the echo received in the vicinity of the emitter is measured; and the looked-for angle is determined from the known position of the emitter relative to the reference position, and from the firing direction at the moment when the echo amplitude is at a maximum.

18 Claims, 6 Drawing Sheets

FIG_1

FIG_2

FIG_3

FIG_7

FIG_8

METHOD OF MEASURING AN ANGLE IN THREE DIMENSIONS, BY SCANNING AN ULTRASOUND BEAM

The present invention relates to a method of measuring an angle in three dimensions, by scanning an ultrasound beam that is emitted into the air.

A particular application of the present invention lies in the field of robotics, e.g. for locating objects in a volume or for positioning a mobile robot relative to certain reference points within said volume.

BACKGROUND OF THE INVENTION

A device that is already known for determining the position of an object is described in EP-A-O 148 952, which device includes an element for emitting ultrasound waves towards an object and for receiving waves reflected by said object, together with a drive member which is suitable for causing said element to oscillate about an axis so that the ultrasound waves emitted by the element scan a detection zone in which the object is situated.

That prior device suffers from the particular drawback of including moving parts, thereby making it relatively expensive to manufacture, and preventing it from achieving detection speed and accuracy that are satisfactory.

OBJECTS AND SUMMARY OF THE INVENTION

The present invention seeks to provide a method which avoids those problems and which enables high accuracy to be achieved, which accuracy can easily be to within one degree.

The present invention provides a method of measuring an angle in three dimensions relative to a reference direction, wherein:

- a transducer array emitter is placed in a known position relative to the reference direction;
- the transducers of the array are excited so as to emit ultrasound waves in air mainly in a firing direction;
- by applying phase offsets between the excitation signals for the transducers of the array, the firing direction is varied, thereby causing it to scan a given observation zone, while simultaneously the echo received in the vicinity of the emitter is measured; and
- the looked-for angle is determined from the known position of the emitter relative to the reference position, and from the firing direction at the moment when the echo amplitude is at a maximum.

The method of the invention presents the particular advantage that firing directivity can be very narrow or fine because of the array of transducers that makes it possible to fire with an angle of divergence that decreases in size with increasing overall sensor diameter, or more generally increasing the number of individual transducers.

In addition, by creating a phase shift electronically between the excitation signals of the transducers in the array, it is possible to scan the detection zone while keeping the emitter in a fixed position, and scanning can be done very quickly, e.g. for a distance of 1 m between sensor and obstacle, 10 shots can be done over 100° with a period of about 100 ms.

Thus, in the invention, it suffices to pick up the ultrasound wave echo and to analyze it with respect only to amplitude, without paying attention to waveform or return direction.

In a first embodiment of the invention, the method is used for determining the angular position of an object in three dimensions relative to the reference direction.

In said first implementation, the object is assumed to be a point or is considered as having only one point of maximum reflection.

In this embodiment, the transducer array emitter is placed perpendicularly to the reference direction and the steps of the method as defined above are performed.

In a second implementation of the invention, the method is used for determining the orientation of a substantially plane surface relative to the reference direction.

In this second implementation, the transducer array emitter is placed parallel to the reference direction and the steps of the above-defined method are performed, with the looked-for angle being the angle formed between the surface and the reference direction.

It will be understood that in this second implementation, the amplitude of the echo is at a maximum when the firing direction is normal to the plane surface.

To obtain a meaningful measurement, it is necessary for the plane surface to offer special reflection conditions to the ultrasound wave. In particular, it is necessary for the source to be smooth in order to avoid diffraction.

By way of example, this second implementation may be used for guiding a mobile robot, while verifying that the direction in which the robot is moving remains parallel to said wall.

To implement the invention, it is possible to use a transducer array emitter having a single dimension, i.e. in which a plurality of transducers are in alignment along an axis X and are oriented so that each of them emits a soundwave in a direction Y perpendicular to the axis X.

Under such circumstances, the ultrasound wave emitted by the emitter has a main lobe and secondarily lobes, each lobe being constituted by a sheet that extends substantially in a firing plane passing through the center of the sensor and parallel to a Z axis which is perpendicular to both the X axis and the Y axis.

By applying phase shifts between the excitation signals for the transducers, it is possible to rotate the firing plane for each lobe about the Z axis.

In accordance with the invention, it is also possible to use a transducer array emitter having two dimensions.

Under such circumstances, the transducers are preferably placed at the nodes of a regular array having a triangular or a square mesh.

Preferably, the array is constituted by a plurality of alignments of transducers, with the axes of the alignments intersecting at the center of a common central transducer.

If all of the transducers of such an array are excited, an ultrasound wave is obtained which has a circularly symmetrical main lobe whose angle of divergence decreases with increasing overall diameter of the emitter for a given frequency.

When a one-dimensional array of transducers is used, the search area can be scanned in two dimensions only (X and Y directions), and when a two-dimensional array of transducers is used, the search area can be scanned in three dimensions (X, Y, and Z directions).

In a particular implementation of the invention, the power delivered to each transducer is weighted, i.e. the power of the wave emitted by each transducer of the array is weighted, thereby making it possible to modify lobe distribution.

This makes it possible to match the spacing between lobes to the size of the object whose angular position is to be determined, or to the suitability of the surface whose orientation is to be determined for reflecting ultrasound waves without diffracting them.

This adaptation makes it possible to optimize the method for an object of given size or for maximum resolution.

BRIEF DESCRIPTION OF THE DRAWINGS

To make the invention easier to understand, there follows a description of embodiments given as non-limiting examples, and with reference to the accompanying drawings, in which.

MORE DETAILED DESCRIPTION

Figure 1:
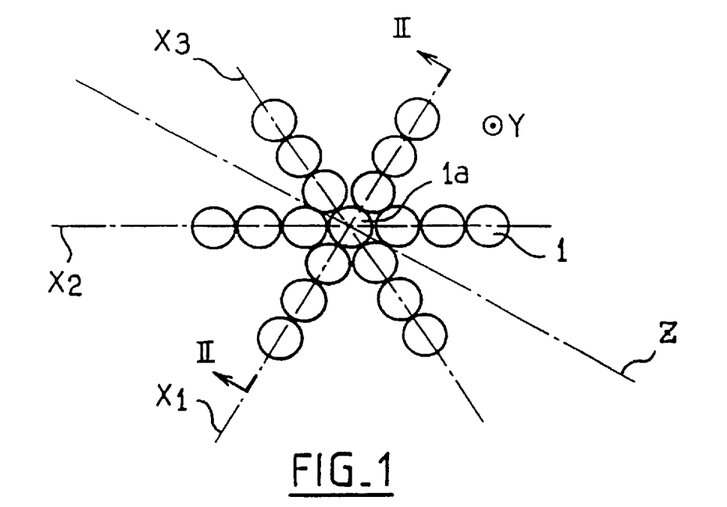
FIG. 1 is a front view of a transducer array sensor.

The emitter shown in FIG. 1 has transducers 1 in alignment on three coplanar axes $X_1$, $X_2$, and $X_3$ which are mutually at angles of 60° and which intersect at the center of a central transducer 1a.

All of the transducers 1 are disposed so as to emit in a common direction Y perpendicular to the axes $X_1$, $X_2$, and $X_3$.

In use, this emitter can be powered so as to emit only from transducers situated on the axis $X_1$. Under such circumstances, the emitter is considered as being constituted by a one-dimensional array of transducers.

During emission, interference arises between the ultrasound waves emitted by the various transducers on the axis $X_1$, giving rise to an overall ultrasound wave that is subdivided into a plurality of narrow volumes called "lobes" each of which is situated about its own firing plane, with all of the firing planes sharing a common Z axis passing through the center of the emitter and perpendicular to the axes $X_1$ and Y.

Figure 2:
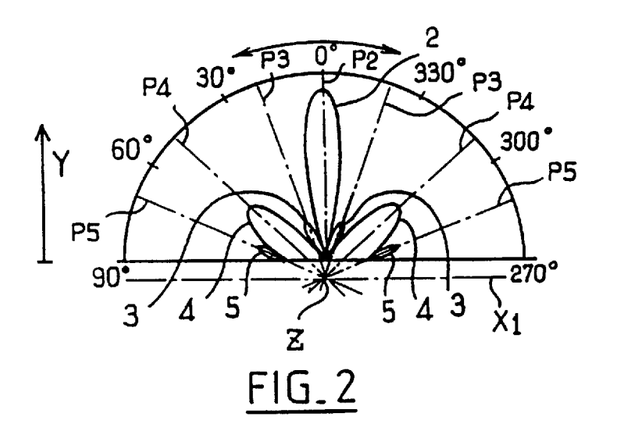
FIG. 2 is a section view on II—II of FIG. 1 showing the radiation pattern of ultrasound waves emitted by the emitter.

In FIG. 2, which is a section through said lobes, on a plane II—II perpendicular to the Z axis, it can clearly be seen that there is a main central lobe 2 having an angle of divergence of about 20°, together with secondary lobes 3, 4, and 5 distributed on either side of the main lobe.

The firing planes P2, P3, P4, and P5 of the various lobes 2, 3, 4, and 5, intersect on the Z axis.

Figure 3:
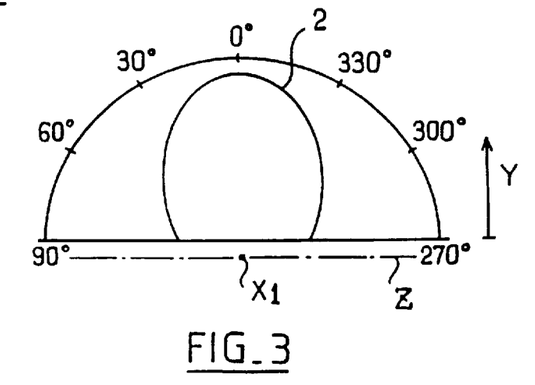
FIG. 3 is a section view on plane P2 of FIG. 2 showing the radiation pattern of ultrasound waves emitted by the emitter.

In FIG. 3, which is a section view through the main lobe 2 taken on its firing plane P2, it can be seen that this main lobe has a much broader envelope, with an angle of divergence of about 100°.

The same applies to the secondary lobes 3, 4, and 5, however they are of lower power than the main lobe.

By varying phase offsets between the excitation signals applied to the transducers on the axis $X_1$, the orientations of the firing planes P2 to P5 are modified, which planes then rotate about the axis Z, as shown by the double-headed arrow in FIG. 2. Simultaneously, the radiation pattern of the lobes, i.e. their energy distribution in three dimensions changes, with some lobes becoming larger and others disappearing almost completely. Nevertheless, the main lobe remains the most important lobe.

In conventional manner, by increasing the number of transducers that are excited along the axis $X_1$ at any given frequency, the directivity of the lobes can be increased, which amounts to reducing their angle of divergence in the plane perpendicular to the Z axis,.

Figure 4:
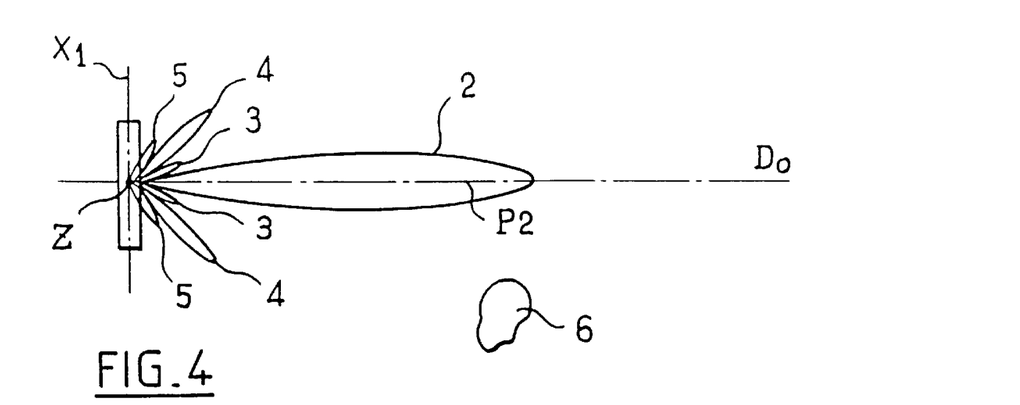
FIG. 4 shows the emitter emitting a signal into a medium in order to detect the angular position of an object.
Figure 5:
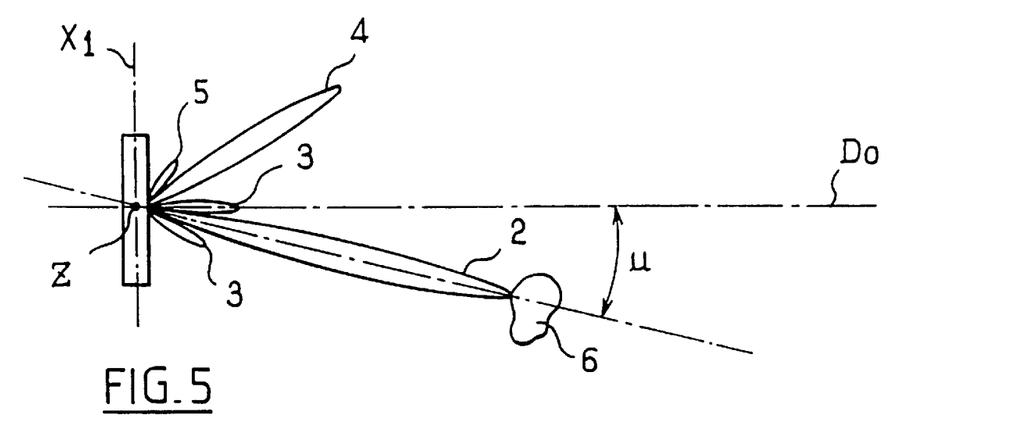
FIG. 5 is a view analogous to FIG. 4, showing how the medium is scanned.
Figure 7:
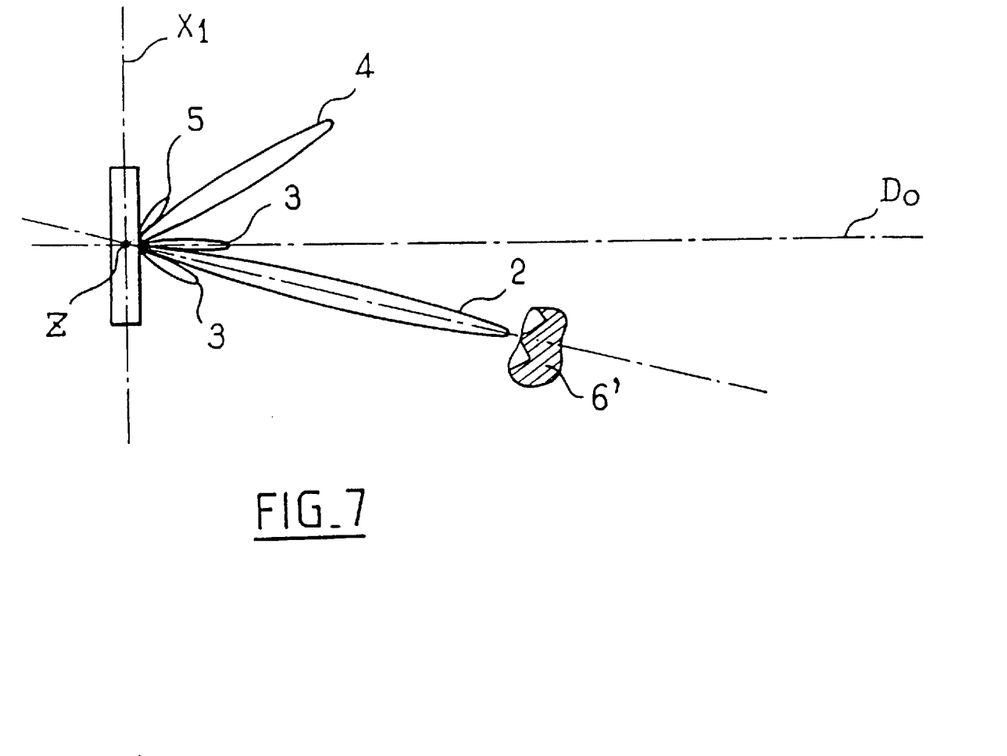
FIG. 7 is a view analogous to FIG. 5, showing a different object.

In FIGS. 4, 5, and 7, the emitter is shown in section on the plane II—II.

In FIG. 4, the firing plane P2 of the main lobe is perpendicular to the axis $X_1$ since no phase offsets have been established between the excitation signals applied to the various transducers.

Reference is made to a reference direction $D_o$ lying in said plane and relative to which it is desired to determine the angular position of an object 6.

For the purpose of implementing the method of the invention, the object 6 is assumed to be a point compared with the size of the lobes, or is considered as presenting a single point of maximum reflection.

By creating phase offsets, the volume situated in front of the sensor is scanned by rotating the firing planes about the Z axis as shown by the double-headed arrow in FIG. 5.

It can be seen in FIG. 5 that the lobe radiation pattern changes, with the bottom lobe 4 (in the drawing) disappearing almost completely while the top lobe 4 (again in the drawing) increases in size.

The same change occurs, but to a lesser extent, with the lobes 3.

Figure 6:
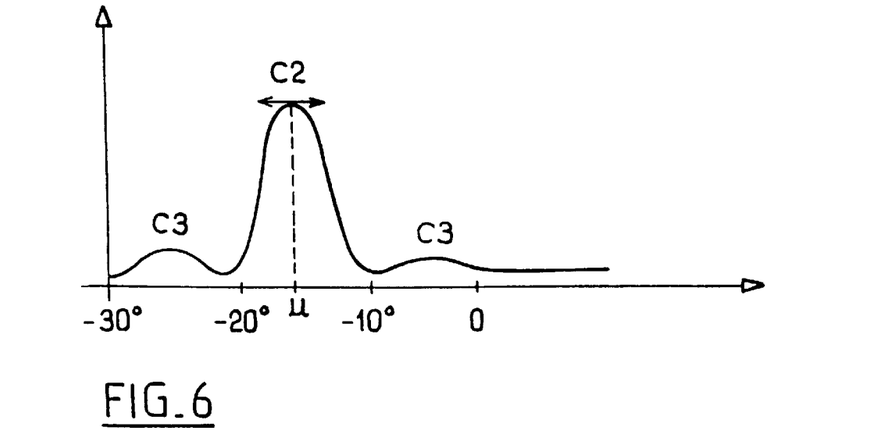
FIG. 6 is a graph showing echo amplitude as picked up during scanning.

By way of example, FIG. 6 shows how the amplitude of the echo as picked up by one of the unused transducers in the sensor varies during such scanning as a function of the angle between $D_o$ and P2.

Whatever the assumptions made, i.e. regardless of whether the object 6 is assumed to be a point or whether it is considered as having a single point of maximum reflection, the assumption can be made valid by ensuring that the diagram plotting echo amplitude as a function of scanning angle does indeed correspond to the known directivity of the emitter, i.e. the known distribution of the main and secondary lobes of the emitted wave.

In other words, if the amplitude diagram of FIG. 6 shows echo variation that reflects the succession of lobes passing over the object, then, a posteriori, it can be verified that it was indeed valid to assume that the object is a point or that it presents a single point of maximum reflection.

However, in FIG. 6, it can be seen that the presence of the object 6 gives rise to a reflection for each lobe when the firing plane of that lobe encounters said object.

This reflection gives rise to an increase in the amplitude of the echo as picked up.

Thus, FIG. 6 shows peaks C3 corresponding to the secondary lobes 3 and a peak C2 corresponding to the main lobe 2.

The assumption concerning the object 6 is thus valid.

By determining the position of the top of the peak C2, it is possible to discover the angle u between the firing plane P2 of the main lobe and the reference direction $D_o$ when the main lobe encounters the point on the object from which reflection is a maximum, as shown in FIG. 5.

It is thus possible to determine with great accuracy the angle u formed by the reference direction $D_o$ and the straight line Du passing through the center of the emitter and through said point of maximum reflection on the object.

Knowing said angle u can be advantageous when a mobile robot needs to be positioned relative to known reference points.

For unknown reference points, it is particularly variation in the angle u during movement of the mobile robot which, in combination with other measurements, makes it possible to determine the motion of the robot with high accuracy.

Figure 8:
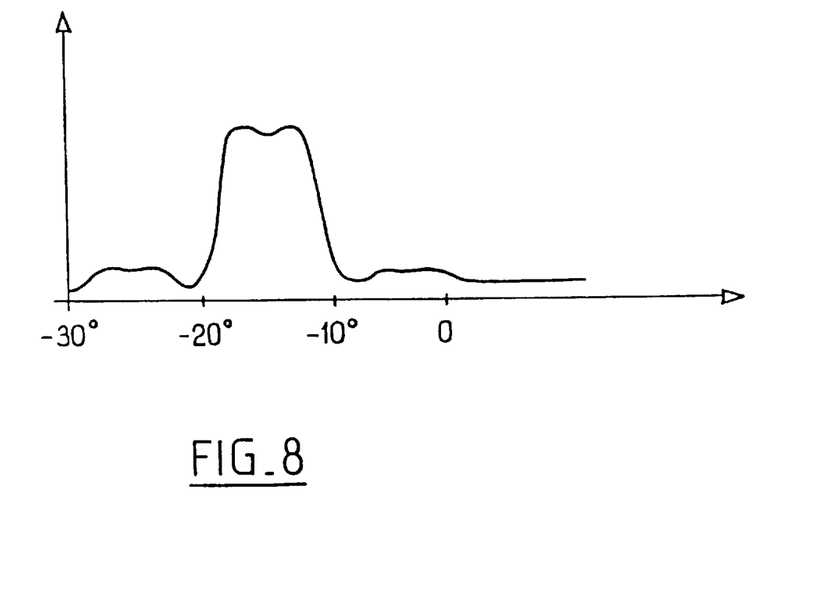
FIG. 8 is a graph showing the amplitude of the echo picked up during the scanning of FIG. 7.

If the same scanning is performed on an object 6' which has two points of maximum reflection, as shown in FIG. 7, then the echo amplitude diagram of FIG. 8 is obtained which is no longer an image of the known distribution of the lobes of the emitted wave.

Under such circumstances, the assumption whereby the object 6' can be taken to be a point or considered as having only one point of maximum reflection is found to be untrue.

On sight of such a diagram, analysis can be refined in order to attempt to discover why the echo amplitude diagram has this appearance.

A first method consists in filtering from the echo signal that is picked up those waves which arrive over a given time interval. It is thus possible to distinguish between waves reflected from two objects that lie in the same direction relative to the reference direction, but which are placed at different distances from the emitter.

In the present case such time filtering will not suffice since the two points of maximum reflection on the object 6' are situated at substantially the same distance from the emitter.

A second method consists in reducing the angle of divergence of the main lobe in an attempt to separate more clearly the two points of reflection. But these two methods are increasingly difficult to apply for obtaining good results with increasing distance of the object 6' from the emitter.

Conversely, a third method can be applied which consists in enlarging the angle of divergence of the main lobe so that the object 6' overall can be treated as though it were a point relative to the size of the lobes. In which case measurement resolution is decreased.

Figure 12:
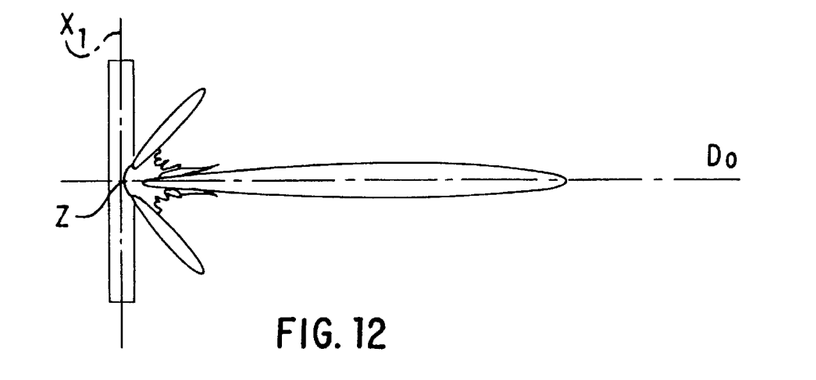
FIG. 12 shows the radiation pattern of ultrasound waves emitted by an emitter with equal weights applied to all the transducers.
Figure 13:
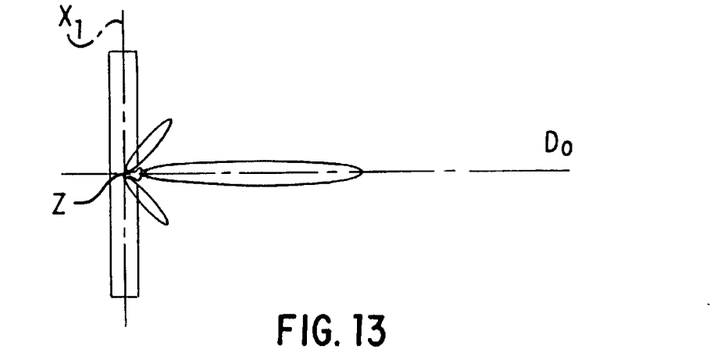
FIG. 13 shows the radiation pattern of ultrasound waves emitted by the same emitter with proper weights applied to the transducers.

Power can be delivered in weighted manner to a plurality of transducers. FIG. 12 shows the ultrasound distribution with equal weights applied to the excitation voltages applied to seven sensors placed on the $X_1$ axis. In comparison, FIG. 13 shows the ultrasound distribution with gradually decreasing weights for the excitation voltage as supplied starting from the center and going outwards along the seven sensors placed on the $X_1$ axis. This gives a main lobe with a wider angle of divergence, but with a smaller number of side lobes. In other words, the lobe distribution can be altered by weighting the voltages supplied to each transducer.

Figure 14:
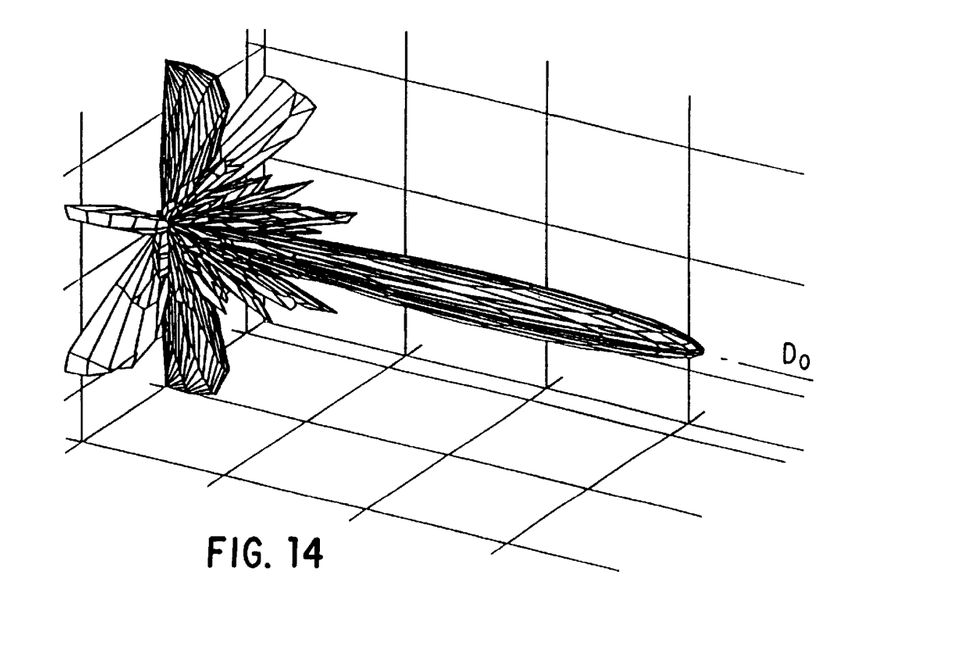
FIG. 14 shows the radiation pattern of ultrasound waves emitted by an emitter comprising transducers on three intersecting axes that are co-planar.

In FIG. 1, by exciting all or some of the transducers placed on the axes $X_1$, $X_2$, and $X_3$, ultrasound can be emitted in the direction Y which is perpendicular to the axes $X_1$, $X_2$, and $X_3$. This case is shown in FIG. 14. As shown in this figure, a cylindrical main lobe 20 is generated by exciting each transducer at the proper frequency. Unlike the examples described above, in this example the detection area can be scanned in three dimensions (X, Y, and Z).

Figure 9:
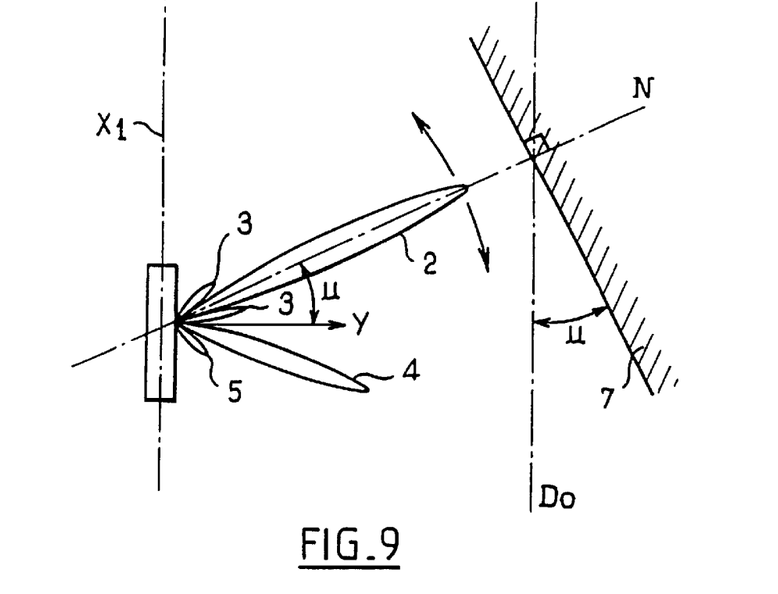
FIG. 9 shows the emitter in front of a wall.
Figure 10:
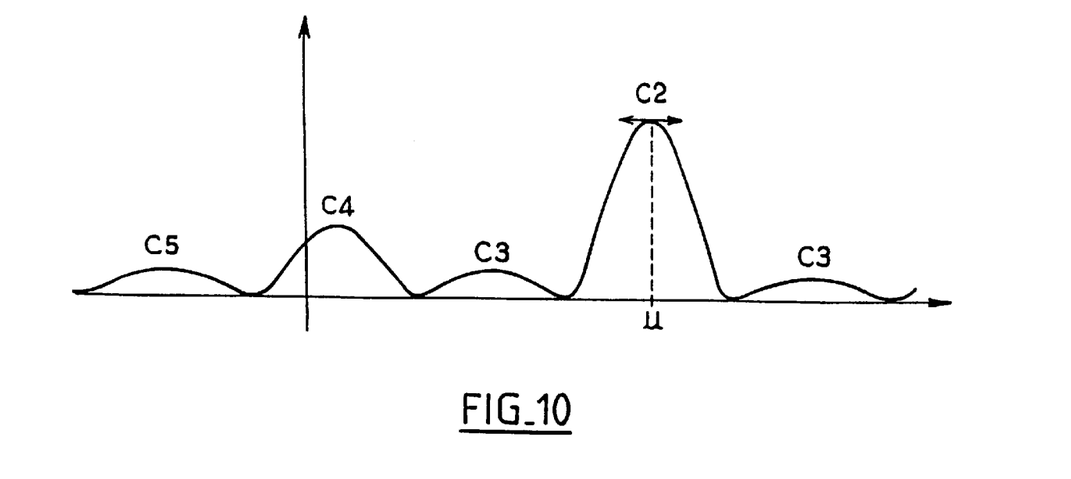
FIG. 10 is a graph showing the amplitude of the echo picked up during scanning in front of the wall.

In FIG. 9, the emitter emits the same signal as before towards a wall 7 which is smooth and plane, and from which an ultrasound wave can be reflected without being backscattered.

The reference direction taken into consideration, $D_o$ is parallel to the axis $X_1$.

During scanning, the signal echo as picked up appears as shown in FIG. 8.

Each main lobe 2 or secondary lobe 3, 4, 5 is reflected on the wall on reaching the base of the normal N to the wall that passes through the center of the emitter.

As before, each peak C2 to C5 in the signal picked up corresponds to a lobe 2 to 5 of the sensor.

In particular, the main lobe 2 corresponds to the tallest peak C2, so it suffices to determine the position of the top thereof to obtain the angle u formed between the normal to the wall N and the direction Y.

This angle u is also the angle formed between the wall and the reference direction $D_o$.

Figure 11:
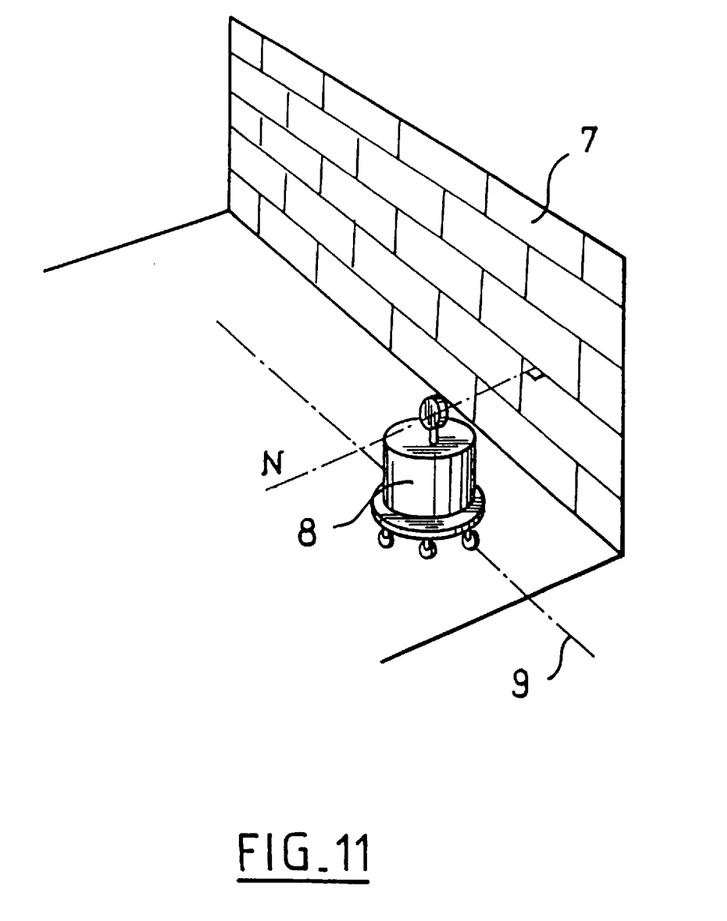
FIG. 11 shows a mobile robot moving along a wall.

As shown in FIG. 11, once the axis u has been determined, it is possible to move the robot 8 while continuously measuring the same axis u and ensuring that it remains constant, thus causing the robot 8 to move along an axis 9 that is parallel to the wall 7.

Naturally, the embodiments described above are not limiting in any way and may be modified in any desirable manner without going beyond the ambit of the invention.

I claim:

1. A method of measuring an angle in three dimensions relative to a reference direction, wherein:

a transducer array emitter is placed in a known position relative to the reference direction;

the transducers of the array are excited so as to emit ultrasound waves in air mainly in a firing direction;

by applying phase offsets between the excitation signals for the transducers of the array, the firing direction is varied, thereby causing it to scan a given observation zone, while simultaneously the echo received in the vicinity of the emitter is measured; and the angle is determined from the known position of the emitter relative to the reference position, and from the firing direction at the moment when the echo amplitude is at a maximum.

2. A method of determining the angular position of an object in three dimensions relative to a reference direction, comprising carrying out the method of claim 1 with the transducer array emitter placed perpendicularly to the reference direction.

3. A method of determining the orientation of a substantially plane surface relative to the reference direction, comprising carrying out the method of claim 1 with the transducer array emitter placed parallel to the reference direction.

4. A method according to claim 1, wherein a one-dimensional transducer array emitter is used, wherein the emitter comprises a plurality of transducers in alignment along an axis X and oriented so that each of the transducers emits a soundwave in a direction Y perpendicular to the axis X.

5. A method according to claim 1, wherein a two-dimensional transducer array emitter is used.

6. A method according to claim 5, wherein the transducers are preferably placed at the nodes of a regular array of triangular or square mesh.

7. A method according to claim 6, wherein the array is constituted by a plurality of sets of aligned transducers, which sets have axes that cross in the center of a common central transducer.

8. A method according to claim 1, wherein the power delivered to each transducer of the emitter transducer array is weighted so as to modify the distribution of the ultrasound wave emitted by said emitter.

9. A method according to claim 2, wherein a one-dimensional transducer array emitter is used, wherein the emitter comprises a plurality of transducers in alignment along an axis X and oriented so that each of them emits a soundwave in a direction Y perpendicular to the axis X.

10. A method according to claim 2, wherein a two-dimensional transducer array emitter is used.

11. A method according to claim 10, wherein the transducers are placed at the nodes of a regular array of triangular or square mesh.

12. A method according to claim 11, wherein the array is constituted by a plurality of sets of aligned transducers, which sets have axes that cross in the center of a common central transducer.

13. A method according to claim 2, wherein the power delivered to each transducer of the emitter transducer array is weighted so as to modify the distribution of the ultrasound wave emitted by said emitter.

14. A method according to claim 3, wherein a one-dimensional transducer array emitter is used, wherein the emitter comprises a plurality of transducers in alignment along an axis X and oriented so that each of them emits a soundwave in a direction Y perpendicular to the axis X.

15. A method according to claim 3, wherein a two-dimensional transducer array emitter is used.

16. A method according to claim 15, wherein the transducers are placed at the nodes of a regular array of triangular or square mesh.

17. A method according to claim 16, wherein the array is constituted by a plurality of sets of aligned transducers, which sets have axes that cross in the center of a common central transducer.

18. A method according to claim 3, wherein the power delivered to each transducer of the emitter transducer array is weighted so as to modify the distribution of the ultrasound wave emitted by said emitter.

* * * * *